United States Patent [19]

Ong et al.

[11] 4,454,279

[45] Jun. 12, 1984

[54] THICKENER MIXTURE FOR THE MANUFACTURE OF AQUEOUS PRINTING INKS FOR GRAVURE PRINTING HEAT SUBLIMABLE DISPERSE DYESTUFFS

[75] Inventors: Sienling Ong, Hofheim am Taunus; Ulrich Karsunky, Hünfelden; Helmut Schmidt, Hofheim am Taunus, all of Fed. Rep. of Germany

[73] Assignee: Hoechst Aktiengesellschaft, Frankfurt am Main, Fed. Rep. of Germany

[21] Appl. No.: 523,893

[22] Filed: Aug. 15, 1983

Related U.S. Application Data

[63] Continuation of Ser. No. 378,413, May 14, 1982, abandoned.

[30] Foreign Application Priority Data

May 18, 1981 [DE] Fed. Rep. of Germany ....... 3119711

[51] Int. Cl.³ .............................................. C08F 5/05
[52] U.S. Cl. .................................... 524/376; 524/517; 524/522; 8/470; 8/471; 8/472
[58] Field of Search ................. 524/376, 377, 387, 389

[56] References Cited

U.S. PATENT DOCUMENTS

| 4,062,823 | 12/1977 | Cheung et al. | 524/376 |
| 4,143,019 | 3/1979 | Burley | 524/376 |
| 4,251,400 | 2/1981 | Columbus | 524/389 |
| 4,325,851 | 4/1982 | Colon et al. | 524/377 |

Primary Examiner—Paul R. Michl
Attorney, Agent, or Firm—Curtis, Morris & Safford

[57] ABSTRACT

The viscosity of aqueous printing inks for gravure printing is adjusted by means of partially organophilic gels which contain plastics mixtures of at least one polymer swelling in water and at least one polymer not swelling in water or to an insignificant extent only, in a solvent mixture of at least two hydrophilic organic hydroxy compounds and one hydrophobic organic hydroxy compound. The printing inks prepared with the aid of the thickener mixtures of the invention contain up to 90% of water, and can be handled as textile printing pastes.

Gravure printing inks on the basis of such plastics gels containing disperse dyestuffs are suitable for the manufacture of transfer printing paper sheets. Since the thickening system adjusting the viscosity contains aqueous alcohols, if any, and no solvents as usual in transfer printing inks, no special measures have to be taken with respect to flammability and explosion risks.

3 Claims, No Drawings

THICKENER MIXTURE FOR THE MANUFACTURE OF AQUEOUS PRINTING INKS FOR GRAVURE PRINTING HEAT SUBLIMABLE DISPERSE DYESTUFFS

This is a continuation of application Ser. No. 378,413, filed May 14, 1982, now abandoned.

The invention provides thickener mixtures for aqueous gravure printing inks, a process for the manufacture of transfer printing paper sheets by gravure printing with aqueous printing inks containing such thickeners, and transfer printing paper sheets so obtained.

The thickener mixtures of the invention comprise an amount of (a) a polymer which practically does not swell in water but swells in an organic solvent which may be diluted with up to 50 weight % of water, and (b) a polymer which swells in water.

These two polymers in the form of their aqueous-organic gels allow to adjust the viscosity of aqueous gravure printing inks. In addition to their thickening action, they have dispersing, film-forming and migration-inhibiting properties.

These aqueous-organic gels are expediently prepared from concentrates which in addition to the two polymers contain as further components (c) a water-soluble, low molecular weight polyhydroxy compound solid at room temperature, and (d) an organic solvent water-immiscible at room temperature but completely miscible with organic, completely water-miscible solvents.

These concentrates are then combined with a completely water-miscible solvent liquid at room temperature, and with water. A preferred embodiment of the invention provides therefore a concentrate containing as further component (e) the completely water-miscible organic solvent liquid at room temperature in addition to the two polymers (a) and (b), the solid polyhydroxy compound (c) and the water-immiscible solvent (d).

The concentrates may contain furthermore auxiliaries such as surface-active substances, for example emulsifiers, defoamers and sodium sulfite.

Suitable polymers (a) which practically do not swell in water are the copolymers of vinyl acetate and an unsaturated low molecular weight carboxylic acid such as acrylic, crotonic or maleic acid, as described in German Pat. No. 803,956 and British Pat. No. 733,507.

Suitable polymers (b) swelling in water are polyacrylic acids described in U.S. Pat. No. 3,066,118 or German Offenlegungsschrift No. 1,595,727, or copolymers of ethylene and maleic anhydride disclosed in German Offenlegungsschrift No. 2,534,792.

The polymers (a) and (b) may be used also in the form of their salts, especially their ammonium or amine salts. The formation of such salts, if desired, may also be delivered subsequently in the thickener mixture or a corresponding concentrate.

The water-soluble, low molecular weight polyhydroxy compound (c) solid at room temperature is preferably a compound of the formula $$C_nH_{2n+2-m}(OH)_m$$

in which n is an integer of from 4 to 6 and m is an integer of from 1 to 6, with the proviso that m is smaller than or identical to n. These compounds have advantageously a melting point of more than 50° C. Especially suitable are 1,1,1-trimethylolpropane, pentaerythritol or sugar alcohols such as sorbitol or mannitol.

Preferred organic solvents (d) water-immiscible at room temperature, completely miscible however with organic, completely water-miscible solvents are compounds of the formula $$C_aH_{2a+2-b}[O(CH_2-\underset{\underset{CH_3}{|}}{CH}-O)_{x/b}-H]_b$$

in which a is an integer of from 2 to 6, b is an integer of from 1 to 6, and x is a number of from 8 to 60, with the proviso that b is smaller than or identical to a, especially oxypropylates of n-butanol, n-propanol or isopropanol.

The completely water-miscible organic solvents (e) liquid at room temperature are preferably compounds of the formula $$C_yH_{2y+2-z}(OH)_z$$

in wich y and z each are an integer of from 1 to 6 with the proviso that z is smaller than or identical to y, especially compounds having a boiling point of below 90° C. Preferred are n-propanol, isopropanol, especially methanol and ethanol.

From the above components or their combinations the aqueous printing inks comprising tha background of this invention can be prepared according to various methods. One of these methods for example is based on operating with separate thickener pastes: A thickener paste A is prepared from the polymer (a), the water-miscible solvent (e) and water, furthermore a thickener paste B is prepared from the water-immiscible solvent (d), the polymer (b) swelling in water, and a water-miscible solvent (e); these two thickener pastes A and B are mixed with addition of the solid polyhydroxy compound (c), and diluted with water while stirring. The above or other usual auxiliaries can be added to thickener paste A as well as to paste B, or when stirring the two thickener pastes with the solid polyhydroxy compound (c).

Alternatively, combinations of the thickener pastes A and B and the solid polyhydroxy compound (c), optionally with addition of auxiliaries, can be blended to give a thickener concentrate.

In all cases, these thickener concentrates can be processed in simple manner with the dyestuff in a normal commercial form, and with water to give a ready-to-use printing ink.

Expediently, the ready-to-use printing inks contain the following amounts of components, per 1,000 g:

(a) 10 to 100 g, especially 10 to 50 g,
(b) 0.5 to 10 g, especially 1 to 5 g,
(c) 3 to 60 g, especially 3 to 30 g,
(d) 2 to 50 g, especially 3 to 30 g and
(e) 5 to 150 g, especially 5 to 80 g.

Relative to 1,000 g of printing ink, it is of advantage further to add the following components:

0.05 to 0.3 g of emulsifier,
0.1 to 1 g of defoamer, and
0.1 to 0.5 g of sodium sulfite.

As emulsifiers, nonionic compounds having a HLB value (hydrophilic lipophilic balance) of from 2 to 20; as defoamers, water-soluble products are preferred. The sodium sulfite is practically added in crystallized form.

When using the polymers (a) and/or (b) in the form of the free acids, a suitable base is practically added to the batch, preferably about 5 to 25 g of an aqueous 25% ammonia solution, relative to 1,000 g of printing ink.

As far as the thickener mixtures consist of the polymers (a) and (b), or of the components (a), (b), (c) and (d), said thickener mixtures do not contain volatile flammable solvents. Since the liquid solvent (e) is required in an amount only which causes the polymer (a) to swell, the thickener mixtures containing compound (e), and especially the printing inks prepared on their basis contain extremely small amounts of volatile flammable solvents only. Therefore, the safety precautions required in the case of usual gravure printing inks on the basis of solvents can be renounced. With the use of the thickener mixtures of the invention and the aqueous printing inks prepared therefrom, however, transfer printing paper sheets are obtained in gravure printing allowing, surprisingly, to achieve textile prints on heat transfer printing utilizing these sheets, which are identical with respect to the quality attained in gravure printing with corresponding solvent-containing inks. In contrast to known aqueous printing inks, the cups of the gravure screen are completely emptied in the case of the printing inks according to the invention, that is, no "missing dots" occur, which otherwise ensures prints of even pattern.

It is especially advantageous that any paper can be printed with the printing inks obtained with the use of the thickeners of the invention, that is, a specially pretreated paper is not required. It has already been mentioned that the disperse dyestuffs can be used in their commercial form, so that special formulations are not required. It is furthermore not required that the printed transfer paper sheets be coated with a protective layer.

Printing with the printing inks containing the thickeners of the invention is carried out wet-in-dry, that is, intermediate drying follows the print of each color.

The invention provides therefore also a process for the manufacture of heat transfer printing paper sheets according to the gravure printing method by printing of paper with aqueous printing inks containing transferrable disperse dyestuffs, wherein the printing inks contain a thickener of the invention, and an intermediate drying step follows the print of each color. Thus, clearly outlined prints are obtained which are of identical quality as compared to those obtained with usual gravure printing inks on the basis of solvents. The process of the invention can be carried out according to the trichromatic system. Since the printing inks contain only minimum amounts of flammable solvents, the concentration thereof in the exhaust air is at such a low level that no special measures have to be taken with respect to flammability or explosion risks.

The transfer printing paper sheets so obtained are distinguished by an even pattern with sharp outlines and an excellent repeat. The paper sheets have a perfect storage stability and yield outstanding textile prints in heat transfer printing.

Subject of the invention are therefore also transfer printing paper sheets printed according to the gravure printing process with an aqueous printing ink containing a thickener of the invention.

The heat transfer printing process is generally known and described in detail in French Pat. Nos. 1,223,330, 1,334,829 and 1,585,119. In this process, the printed transfer printing paper sheets are closely contacted with the textile material to be printed, and the dyestuff is transferred subsequently from the carrier to the substrate and fixed there under the action of heat and optionally elevated or reduced pressure.

The following Examples illustrate the invention; percentages being by weight unless otherwise stated.

EXAMPLE 1

Preparation of the printing inks from separate thickener pastes:

As thickener paste A, a 50% solution of a copolymer from vinyl acetate and crotonic acid, which does not swell in water, is used, prepared by dissolving

| |
|---|
| 500 g of the copolymer in |
| 240 g of methanol, |
| 203 g of water, |
| 50 g of 25% aqueous ammonia solution, and |
| 7 g of crystalline sodium sulfite |
| 1.000 g | while stirring. The solution has a viscosity of 1.5 to 3.5 Pas.

Thickening paste B is obtained by mixing while stirring

| |
|---|
| 641 g of the reaction product of n-butanol with 17 mols of propylene oxide, |
| 246 g of the ammonium salt of a polyacrylic acid, swelling in water (according to German Auslegeschrift No. 1,103,585, molecular weight 500,000), |
| 95 g of ethanol, and |
| 18 g of the reaction product of oleyl alcohol with 15 mols of ethylene oxide, as emulsifier |
| 1,000 g |

From these thickening pastes, the ready-to-use thickener is obtained as follows:

| |
|---|
| 250 g of the thickening paste A, |
| 30 g of the thickening paste B, |
| 3 g of a water-soluble defoamer, and |
| 17 g of 1,1,1-trimethylolpropane are diluted while stirring with |
| 700 g of water |
| 1,000 g |

From 20 to 200 g of dyestuff are intensely mixed with 250 to 300 g of this aqueous thickener, and diluted with water to yield 1,000 g of a printing ink.

EXAMPLE 2

Preparation of the printing inks using one single thickener concentrate:

| By mixing while stirring of |
|---|
| 250 g of the thickening paste A, |
| 30 g of the thickening paste B, |
| 3 g of a water-soluble defoamer, and |
| 7 g of 1,1,1-trimethylolpropane, |
| 290 g of ready-to-use thickener concentrate are obtained. |

By mixing from 71 to 85 g of this thickener concentrate with 20 to 200 g of dyestuff and adding water to 1,000 g, a ready-to-use printing ink is prepared.

EXAMPLE 3

Trichromatic paper printing:

On a gravure printing machine (system CERUTTIROTOPRESS), a paper web is printed with the following printing inks obtained according to Example 1:

| Dyestuff | Dyestuff according to Example set forth below of European Patent Application No. 28,342 | grams |
|---|---|---|
| Yellow | 19 | 80 |
| Red | 3 | 200 |
| Blue | 14 | 200 |
| Black | * | 400 |

*Mixture of about 80% of blue, 13% of yellow and 7% of red } as indicated

After the print of each color, the printed paper is subjected to an intermediate drying in a hot air drying loft.

The transfer printing paper sheet so obtained does not mark off even on prolonged storage, and yields excellent prints on polyester textile materials in heat transfer printing.

What is claimed is:

1. A thickener mixture for the manufacture of aqueous printing inks suitable for gravure printing heat sublimable disperse dyestuffs onto transfer printing paper sheets which comprises a combination having as the ingredients:
    (a) a copolymer of vinyl acetate and an unsaturated low molecular weight carboxylic acid,
    (b) a copolymer of maleic anhydride and ethylene, or a polyacrylic acid,
    (c) a compound of the formula $$C_nH_{2n+2-m}(OH)_m$$

in which n is an integer of from 4 to 6 and m is an integer of from 1 to 6, with the proviso that m is smaller than or identical to n,
    (d) a compound of the formula $$C_aH_{2a+2-b}[O(CH_2-\underset{\underset{CH_3}{|}}{C}H-O)_{x/b}-H]_b$$

in which a is an integer of from 2 to 6, b is an integer of from 1 to 6, and x is a number of from 8 to 60, with the proviso that b is smaller than or identical to a, and
    (e) a compound of the formula $$C_yH_{2y+2-z}(OH)_z$$

in which y and z each are an integer of from 1 to 6 with the proviso that z is smaller than or identical to y.

2. The thickener mixture as defined in claim 1 wherein (a) is 10 to 100 grams, (b) is 0.5 to 10 grams, (c) is 3 to 60 grams, and (d) is 2 to 50 grams.

3. The thickener mixture as defined in claim 1 which further contains from 0.5 to 0.3 grams of an emulsifier, 0.1 to 1 gram of a defoamer, and 0.1 to 0.5 grams of sodium sulfite.

* * * * *